United States Patent
Clawson

(10) Patent No.: US 10,132,045 B2
(45) Date of Patent: Nov. 20, 2018

(54) TRACTION ASSIST DEVICE

(71) Applicant: Michael Clawson, Hampton, VA (US)

(72) Inventor: Michael Clawson, Hampton, VA (US)

( * ) Notice: Subject to any disclaimer, the term of this patent is extended or adjusted under 35 U.S.C. 154(b) by 237 days.

(21) Appl. No.: 15/211,479

(22) Filed: Jul. 15, 2016

(65) Prior Publication Data

US 2018/0015783 A1    Jan. 18, 2018

(51) Int. Cl.
*B60B 39/12* (2006.01)
*E01B 23/00* (2006.01)

(52) U.S. Cl.
CPC .............. *E01B 23/00* (2013.01); *B60B 39/12* (2013.01)

(58) Field of Classification Search
CPC .............. B60B 39/12; B60B 2900/551; B60B 2900/721; B60B 15/00; B60B 39/00
USPC ........................................................... 238/14
See application file for complete search history.

(56) References Cited

U.S. PATENT DOCUMENTS

| | | | |
|---|---|---|---|
| 1,222,563 A * | 4/1917 | Rosenberg | A47G 9/062 5/419 |
| 3,025,002 A * | 3/1962 | Kunz | B60B 39/12 238/14 |
| 3,152,761 A | 10/1964 | Vaughan, Jr. et al. | |
| 5,204,159 A * | 4/1993 | Tan | E01C 5/20 15/215 |
| 5,862,983 A * | 1/1999 | Andrus | E01C 9/08 238/14 |
| D450,645 S | 11/2001 | Love | |
| 7,350,719 B1 | 4/2008 | Brenner | |
| 8,210,443 B2 | 7/2012 | Studstill | |
| 8,215,568 B1 | 7/2012 | Pitsolis | |
| 8,448,877 B1 | 5/2013 | Aubin | |
| 8,827,173 B2 | 9/2014 | Nutzati | |
| 2004/0118726 A1 * | 6/2004 | Meyer | A45C 11/26 206/419 |
| 2006/0215940 A1 * | 9/2006 | May | A01G 20/43 383/4 |

* cited by examiner

*Primary Examiner* — Mark T Le

(57) ABSTRACT

A traction assist device for mobilizing vehicles stuck in surfaces such as snow and ice includes a panel that has a top face, which is coarse. The panel is flexible, such that the panel is manipulable from an extended configuration into a rolled configuration. A plurality of grasps is coupled to and extends transversely from a bottom face of the panel. The grasps are configured to penetrate into surfaces, such as snow and ice, when the panel is positioned on the surface and a tire of a vehicle is positioned on the top face of the panel. The grasps retain the panel in a fixed position. The top face of the panel is configured to grip the tire, such that traction is supplied of the vehicle.

19 Claims, 4 Drawing Sheets

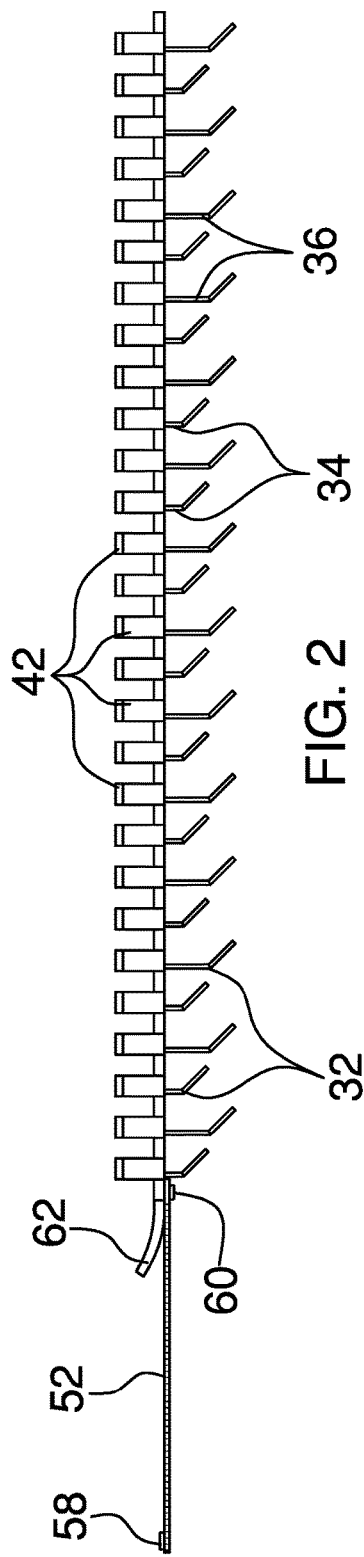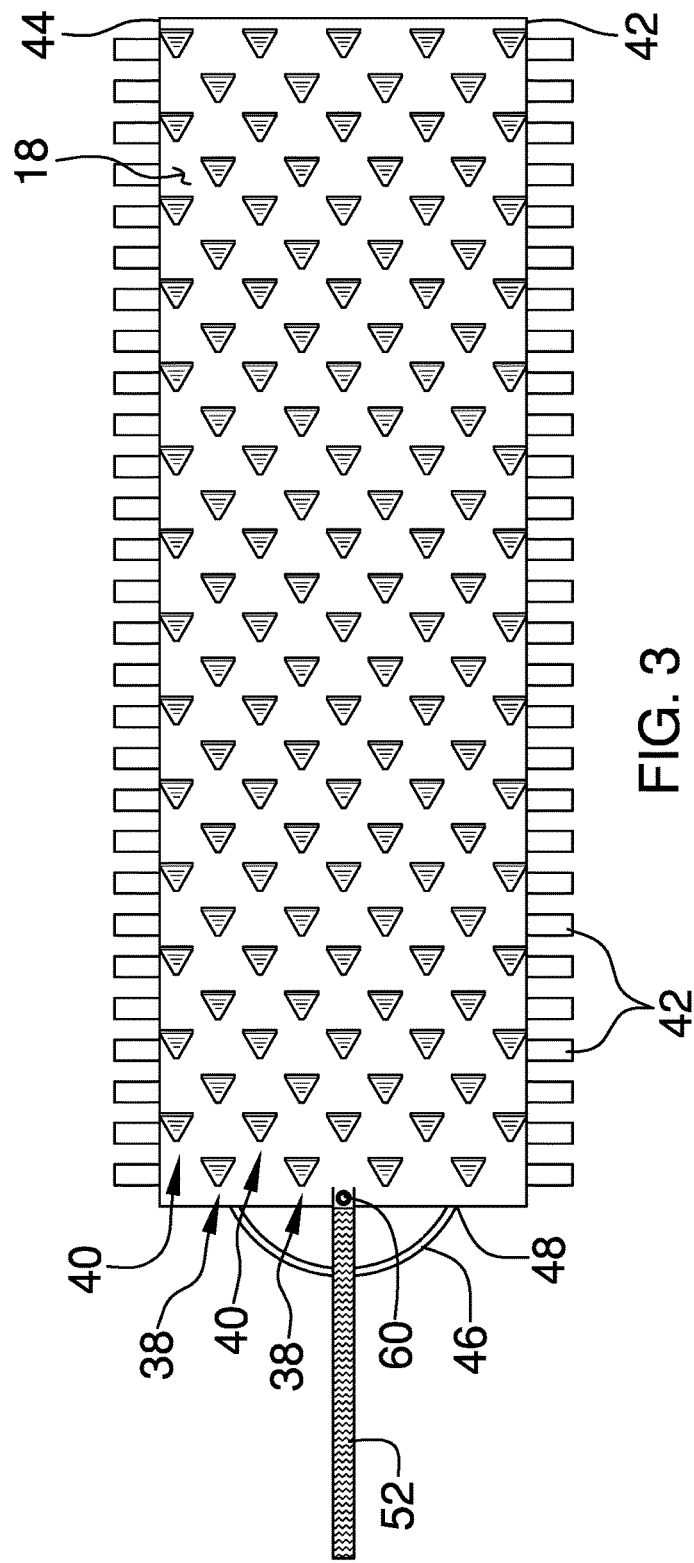

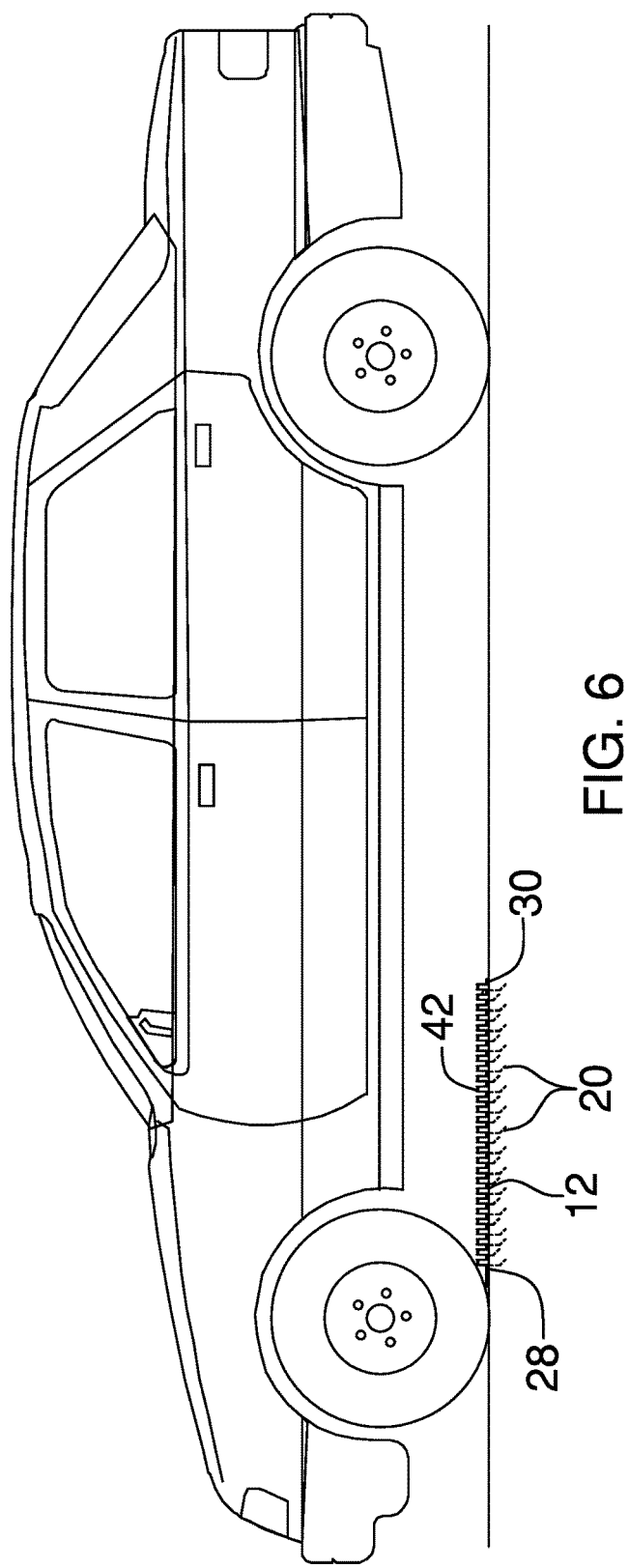

TRACTION ASSIST DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to traction assist devices and more particularly pertains to a new traction assist device for mobilizing vehicles stuck in surfaces such as snow and ice.

BRIEF SUMMARY OF THE INVENTION

An embodiment of the disclosure meets the needs presented above by generally comprising a panel that has a top face, which is coarse. The panel is flexible, such that the panel is manipulable from an extended configuration into a rolled configuration. A plurality of grasps is coupled to and extends transversely from a bottom face of the panel. The grasps are configured to penetrate into surfaces, such as snow and ice, when the panel is positioned on the surface and a tire of a vehicle is positioned on the top face of the panel. The grasps retain the panel in a fixed position. The top face of the panel is configured to grip the tire, such that traction is supplied of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a side view of an embodiment of the disclosure.

FIG. 3 is a bottom view of an embodiment of the disclosure.

FIG. 6 is an in-use view of an embodiment of the disclosure.

DETAILED DESCRIPTION OF THE INVENTION

Figure 1:
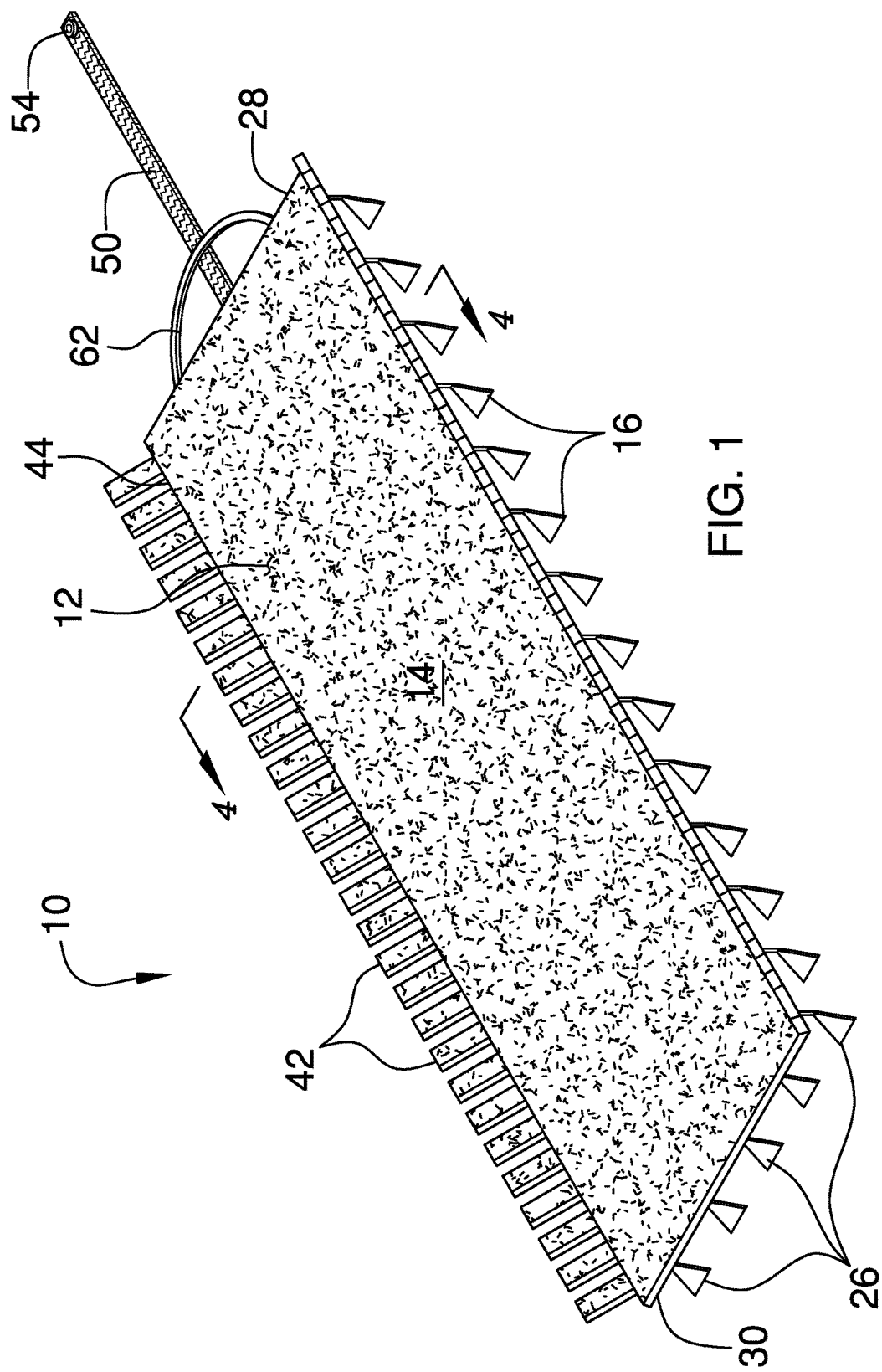
FIG. 1 is an isometric perspective view of a traction assist device according to an embodiment of the disclosure.
Figure 4:
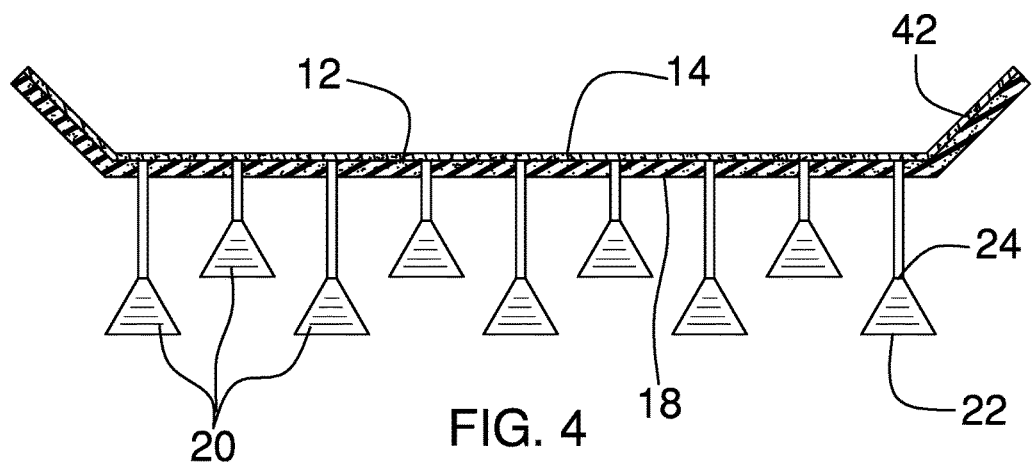
FIG. 4 is a cross-sectional view of an embodiment of the disclosure.
Figure 5:
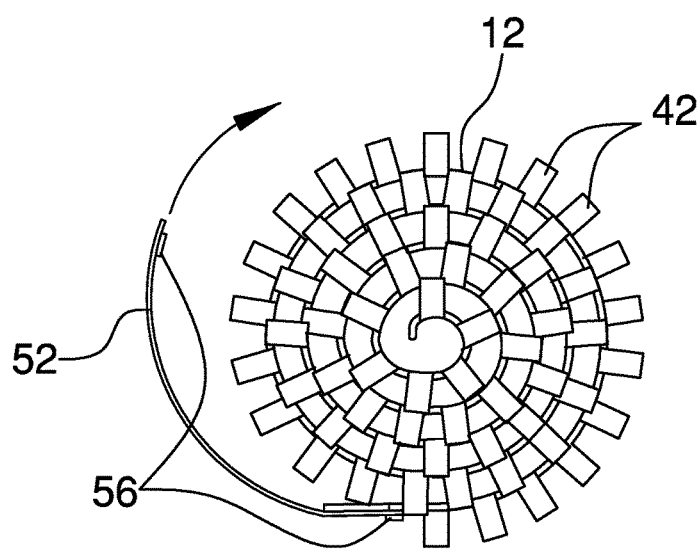
FIG. 5 is a side view of an embodiment of the disclosure.

With reference now to the drawings, and in particular to FIGS. 1 through 6 thereof, a new traction assist device embodying the principles and concepts of an embodiment of the disclosure and generally designated by the reference numeral 10 will be described.

As best illustrated in FIGS. 1 through 6, the traction assist device 10 generally comprises a panel 12 that has a top face 14. The top face 14 is coarse, such that the top face 14 is gripping. The panel 12 is flexible, such that the panel 12 is manipulable from an extended configuration into a rolled configuration. In one embodiment, the panel 12 is substantially rectangularly shaped.

A plurality of grasps 16 is coupled to and extends transversely from a bottom face 18 of the panel 12. The grasps 16 are configured to penetrate into surfaces, such as snow and ice, when the panel 12 is positioned on the surface and a tire of a vehicle is positioned on the top face 14 of the panel 12. The grasps 16 retain the panel 12 in a fixed position, and the top face 14 of the panel 12 is configured to grip the tire, such that traction is supplied of the vehicle.

In one embodiment, the grasps 16 comprise blades 20. In another embodiment, the blades 20 are angled relative to the panel 12 when the panel 12 is in the unrolled configuration. In yet another embodiment, the blades 20 are triangularly shaped. The blades 20 are positioned on the panel 12 such that a side 22 of the blade 20 is positioned distal from the panel 12 and a point 24 of the blade 20 is coupled to the panel 12.

In yet another embodiment, the blades 20 are positioned in a plurality of rows 26. Each row 26 extends from proximate to a front 28 to proximate to a rear 30 of the panel 12. In still yet another embodiment, each row 26 is staggered relative to adjacent rows 26.

In one embodiment, the device 10 comprises a plurality of extenders 32. Each extender 32 is positioned between a respective blade 20 and the panel 12, such that the blades 20 are separated from the panel 12. In another embodiment, the plurality of extenders 32 comprises short rods 34 and long rods 36.

In one embodiment, the plurality of extenders 32 is positioned such that the plurality of rows 26 comprises rows having short rods 38 and rows having long rods 40. In another embodiment, the rows having short rods 38 are alternatingly positioned with the rows having long rods 40.

A plurality of tabs 42 is coupled to and extends from opposing edges 44 of the panel 12. The tabs 42 are opposingly positioned relative to the grasps 16. The tabs 42 are positioned on the panel 12 such that the tabs 42 are configured to assist in retention of the panel 12 under the tire of the vehicle. In one embodiment, the tabs 42 are substantially rectangularly shaped.

A handle 62 is coupled to the front 28 of the panel 12. The handle 62 is configured to grasp in the hand of the user to position and lift the panel 12. In one embodiment, the handle 62 comprises a band 46. The band 46 has opposing ends 48 that are coupled to the front 28 of the panel 12.

A retainer 50 is coupled to the panel 12. The retainer 50 is configured to retain the panel 12 in the rolled configuration. In one embodiment, the retainer 50 comprises a strap 52 and a closure 54. The strap 52 is coupled to the front 28 substantially equally distant from the opposing edges 44 of the panel 12. The strap 52 is positioned to wrap around the panel 12 when the panel 12 is in the rolled configuration. In one embodiment, the strap 52 comprises elastic. The closure 54 is coupled to the strap 52 and is positioned to retain the strap 52 around the panel 12 when the panel 12 is in the rolled configuration. In one embodiment, the closure 54 comprises a snap 56. The snap 56 has a female piece 58 coupled to the strap 52 distal from the panel 12. The snap 56 has a male piece 60 coupled to the strap 52 proximate to the panel 12.

In use, the handle 62 is positioned on the panel 12 such that the handle 62 is configured to grasp in the hand of the user to position and lift the panel 12. The grasps 16 are positioned on the panel 12 such that the grasps 16 are configured to penetrate into surfaces, such as snow and ice, when the panel 12 is positioned on the surface and a tire of a vehicle is positioned on the top face 14 of the panel 12. The grasps 16 retain the panel 12 in a fixed position. The top face 14 of the panel 12 is configured to grip the tire, such that traction is supplied of the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A traction assist device comprising:
    a panel having a top face, said top face being coarse, such that said top face is gripping, said panel being flexible such that said panel is manipulable from an extended configuration into a rolled configuration;
    a plurality of grasps coupled to and extending transversely from a bottom face of said panel, wherein said grasps are positioned on said panel such that said grasps are configured to penetrate into a surface when said panel is positioned on the surface and a tire of a vehicle is positioned on said top face of said panel to retain said panel in a fixed position, such that said top face of said panel is configured to grip the tire, such that traction is supplied of the vehicle; and
    a plurality of tabs coupled to and extending from opposing edges of said panel, said tabs being opposingly positioned relative to said grasps, wherein said tabs are positioned on said panel such that said tabs are configured to assist in retention of said panel under the tire of the vehicle.

2. The device of claim 1, further including said panel being substantially rectangularly shaped.

3. The device of claim 1, further including said grasps comprising blades.

4. The device of claim 3, further including said blades being angled relative to said panel when said panel is in the unrolled configuration.

5. A traction assist device comprising:
    a panel having a top face, said top face being coarse, such that said top face is gripping, said panel being flexible such that said panel is manipulable from an extended configuration into a rolled configuration;
    a plurality of grasps coupled to and extending transversely from a bottom face of said panel, wherein said grasps are positioned on said panel such that said grasps are configured to penetrate into a surface when said panel is positioned on the surface and a tire of a vehicle is positioned on said top face of said panel to retain said panel in a fixed position, such that said top face of said panel is configured to grip the tire, such that traction is supplied of the vehicle, said grasps comprising blades, said blades being triangularly shaped, said blades being positioned on said panel such that a side of said blade is positioned distal from said panel and a point of said blade is coupled to said panel.

6. The device of claim 3, further including said blades being positioned in a plurality of rows.

7. The device of claim 6, further including each said row extending from proximate to a front to proximate to a rear of said panel.

8. The device of claim 7, further including each said row being staggered relative to adjacent said rows.

9. The device of claim 6, further including a plurality of extenders, each said extender being positioned between a respective said blade and said panel, such that said blades are separated from said panel.

10. A traction assist device comprising:
    a panel having a top face, said top face being coarse, such that said top face is gripping, said panel being flexible such that said panel is manipulable from an extended configuration into a rolled configuration;
    a plurality of grasps coupled to and extending transversely from a bottom face of said panel, wherein said grasps are positioned on said panel such that said grasps are configured to penetrate into a surface when said panel is positioned on the surface and a tire of a vehicle is positioned on said top face of said panel to retain said panel in a fixed position, such that said top face of said panel is configured to grip the tire, such that traction is supplied of the vehicle, said grasps comprising blades, said blades being positioned in a plurality of rows; and
    a plurality of extenders, each said extender being positioned between a respective said blade and said panel, such that said blades are separated from said panel, said plurality of extenders comprising short rods and long rods.

11. The device of claim 10, further including said plurality of extenders being positioned such that said plurality of rows comprises rows having short rods and rows having long rods.

12. The device of claim 11, further including said rows having short rods being alternatingly positioned with said rows having long rods.

13. The device of claim 1, further including said tabs being substantially rectangularly shaped.

14. The device of claim 1, further including a handle coupled to a front of said panel, wherein said handle is positioned on said panel such that said handle is configured for grasping in a hand of a user to position and lift said panel.

15. The device of claim 14, further including said handle comprising a band, said band having opposing ends coupled to said front of said panel.

16. The device of claim 1, further including a retainer coupled to said panel, said retainer being configured to retain said panel in the rolled configuration.

17. The device of claim 16, further including said retainer comprising:
- a strap coupled to a front of said panel substantially equally distant from said opposing edges of said panel, wherein said strap is positioned to wrap around said panel when said panel is in the rolled configuration; and
- a closure coupled to said strap, wherein said closure is positioned to retain said strap around said panel when said panel is in the rolled configuration.

18. A traction assist device comprising:
- a panel having a top face, said top face being coarse, such that said top face is gripping, said panel being flexible such that said panel is manipulable from an extended configuration into a rolled configuration;
- a plurality of grasps coupled to and extending transversely from a bottom face of said panel, wherein said grasps are positioned on said panel such that said grasps are configured to penetrate into a surface when said panel is positioned on the surface and a tire of a vehicle is positioned on said top face of said panel to retain said panel in a fixed position, such that said top face of said panel is configured to grip the tire, such that traction is supplied of the vehicle;
- a retainer coupled to said panel, said retainer being configured to retain said panel in the rolled configuration, said retainer comprising
  - a strap coupled to a front of said panel substantially equally distant from said opposing edges of said panel, wherein said strap is positioned to wrap around said panel when said panel is in the rolled configuration, said strap comprising elastic, and
  - a closure coupled to said strap, wherein said closure is positioned to retain said strap around said panel when said panel is in the rolled configuration, said closure comprising a snap, said snap having a female piece coupled to said strap distal from said panel, said snap having a male piece coupled to said strap proximate to said panel.

19. A traction assist device comprising:
- a panel having a top face, said top face being coarse, such that said top face is gripping, said panel being flexible such that said panel is manipulable from an extended configuration into a rolled configuration, said panel being substantially rectangularly shaped;
- a plurality of grasps coupled to and extending transversely from a bottom face of said panel, wherein said grasps are positioned on said panel such that said grasps are configured to penetrate into a surface when said panel is positioned on the surface and a tire of a vehicle is positioned on said top face of said panel to retain said panel in a fixed position, such that said top face of said panel is configured to grip the tire, such that traction is supplied of the vehicle, said grasps comprising blades, said blades being angled relative to said panel when said panel is in the unrolled configuration, said blades being triangularly shaped, said blades being positioned on said panel such that a side of said blade is positioned distal from said panel and a point of said blade is coupled to said panel, said blades being positioned in a plurality of rows, each said row extending from proximate to a front to proximate to a rear of said panel, each said row being staggered relative to adjacent said rows;
- a plurality of extenders, each said extender being positioned between a respective said blade and said panel, such that said blades are separated from said panel, said plurality of extenders comprising short rods and long rods, said plurality of extenders being positioned such that said plurality of rows comprises rows having short rods and rows having long rods, said rows having short rods being alternatingly positioned with said rows having long rods;
- a plurality of tabs coupled to and extending from opposing edges of said panel, said tabs being opposingly positioned relative to said grasps, wherein said tabs are positioned on said panel such that said tabs are configured to assist in retention of said panel under the tire of the vehicle, said tabs being substantially rectangularly shaped;
- a handle coupled to said front of said panel, wherein said handle is positioned on said panel such that said handle is configured for grasping in a hand of a user to position and lift said panel, said handle comprising a band, said band having opposing ends coupled to said front of said panel; and
- a retainer coupled to said panel, said retainer being configured to retain said panel in the rolled configuration, said retainer comprising:
  - a strap coupled to said front substantially equally distant from said opposing edges of said panel, wherein said strap is positioned to wrap around said panel when said panel is in the rolled configuration, said strap comprising elastic, and
  - a closure coupled to said strap, wherein said closure is positioned to retain said strap around said panel when said panel is in the rolled configuration, said closure comprising a snap, said snap having a female piece coupled to said strap distal from said panel, said snap having a male piece coupled to said strap proximate to said panel.

* * * * *